Feb. 17, 1959

K. H. HUPPERT ET AL 2,874,260

RESISTANCE THERMOMETER CIRCUITS

Filed Oct. 2, 1956

Inventors
Karl H. Huppert
Erwin K. Weise
Helmuth O. Vogel
Attorney

United States Patent Office 2,874,260
Patented Feb. 17, 1959

2,874,260

RESISTANCE THERMOMETER CIRCUITS

Karl H. Huppert, Chicago, and Erwin K. Weise, Urbana, Ill., assignors to Semicon Inc., a corporation of Illinois Application October 2, 1956, Serial No. 613,585

6 Claims. (Cl. 215—20)

This invention relates generally to resistance thermometer circuitry, and more specifically to improved circuit arrangements for resistance thermometers wherein the circuits include thermistors.

The objects of the present invention is to provide control circuits for suitable electrically operated equipment where through the novel inclusion of thermistors in the control circuits, the sensitivity of the control circuit is greatly increased over that of similar control circuits known in the art.

It is another object of the present invention to provide means for a circuit including a resistance thermometer having a positive coefficient fo resistance and an ammeter for amplifying the effect of changes of resistance in the metal resistance thermometer in a reading upon the ammeter.

It is another object of the present invention to combine a thermistor having a negative coefficient of resistance and a resistance thermometer having a positive coefficient of resistance with a control circuit for controlling the operation of some electrically operated device.

It is a further object of the present invention to provide a control circuit including a metal resistance thermometer and a negative thermistor with an anticipator device for controlling the operation of any suitable electrically operated device so that the operations of the device are performed with a minimum number of fluctuations.

It is another object of the present invention to provide a control circuit for an electric furnace wherein the temperature fluctuations from a predetermined temperature setting will be at a minimum.

It is another object of the present invention to provide an electrical control circuit for an electric furnace wherein the control circuit includes a metal resistance thermometer, a thermistor having an amplifying effect, and an anticipator element operating in cooperation with the other elements of the control circuit to maintain the temperature of the electric furnace at a predetermined temperature setting with a minimum number of temperature fluctuations from that setting.

Other objects and the features of the present invention will be apparent upon perusal of the following specification and drawings of which:

The present embodiments are the preferred embodiments but it is to be understood that changes can be made in the present embodiments by one skilled in the art without departing from the spirit and scope of the present invention.

Figure 3:
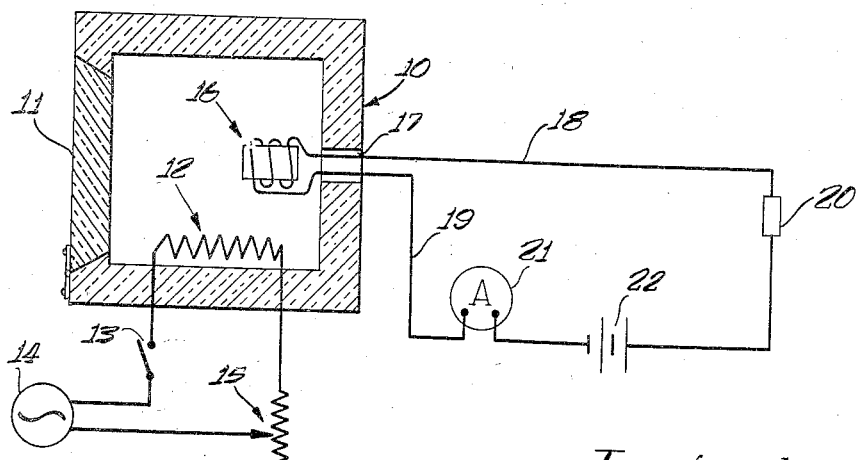
Figure 3 is a diagrammatic view of one embodiment of the present invention.

For a detailed description of the present invention, reference is first made to Figure 3. An electric furnace 10 is shown somewhat diagrammatically and in cross-section. Electric furnace 10 comprises a double-walled container having insulation between the walls and having an insulated door 11 on one side thereof for the insertion and removal of articles to be heated within the electric furnace 10. For heating the electric furnace 10 to the desired temperature, a heating coil 12 is provided. One side of the heating coil 12 is connected to a single pole single throw switch 13 which, in turn, is connected to a power source 14. The other end of the heating coil 12 is connected to a rheostat 15, the other side of which, in turn, is connected to the source of power 14. Thus it may be seen that when the switch 13 is closed a voltage is applied across the heating coil 12, the magnitude of which will be dependent upon the setting of the rheostat 15.

To register the temperature at any time within the electric furnace 10, a resistance thermometer 16 is provided. The resistance thermometer 16 is mounted within the electric furnace 10 through an opening 17 in one wall thereof. The resistance thermometer 16 may be of any suitable type well known in the art, such as a metal resistance thermometer of a coil of platinum wire wound on a mica frame and enclosed in a protective tube. Although this invention is hereinafter described as using a metal resistance thermometer it is not to be limited thereto, since the resistance thermometer can also comprise a ceramic rod formed of a conducting material having a positive coefficient of resistance. Each end of the platinum wire of the resistance thermometer 16 is connected to conductors 18 and 19. Conductor 18 in turn is connected to one side of a negative thermistor 20. Conductor 19 in turn is connected to one side of an ammeter 21. The other side of the ammeter 21 is connected to one side of the battery 22, and the other side of the battery 22 is connected to the other side of the thermistor 20.

Figure 1:
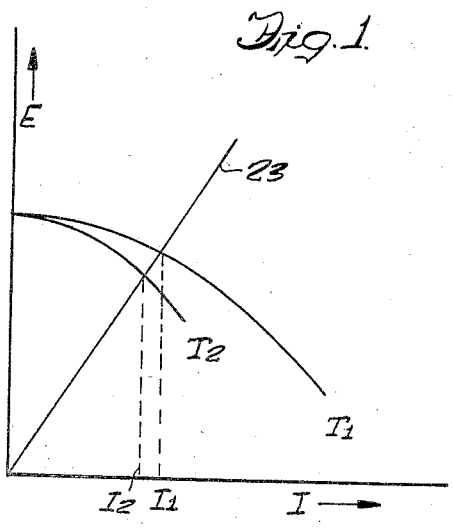
Figures 1 and 2 are graphs explaining the characteristics of a number of the elements of the invention.
Figure 2:
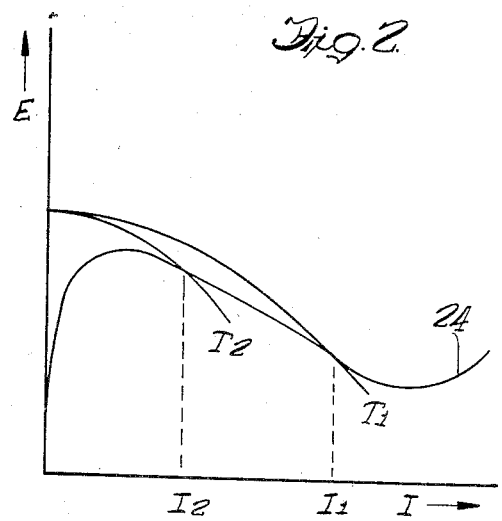

In explaining the operation of the embodiment shown in Figure 3 reference is additionally made to Figures 1 and 2. Considering the basic embodiment as shown in Figure 3 but substituting an ohmic resistor for the thermistor 20, the voltage-current characteristics of the ohmic resistor will be shown by a line such as line 23 of Figure 1. Two sample curves for the resistance thermometer 16 are shown in Figure 1 and designated $T_1$ and $T_2$. Considering the currents $I_1$ and $I_2$ at the points where the line 23 intersects the curves $T_1$ and $T_2$ respectively, it may be seen that there is a certain incremental current change in going from $T_1$ and $T_2$ along the line 23. This incremental current change may now be compared to that shown in Figure 2 wherein the negative thermistor 20 is in the circuit as shown in Figure 3. If a thermistor with a horizontal or more or less falling voltage-current characteristic is selected for thermistor 20, it will appear on the voltage-current graph of Figure 2 as a curve such as curve 24. The same temperature curves at the temperatures of $T_1$ and $T_2$ of the resistance thermometer 16 are shown in the graph of Figure 2 as those which are shown in Figure 1. Considering now the incremental current change in going from temperature $T_1$ to $T_2$ along curve 24 it may be seen that the incremental current change is much greater than that shown in Figure 1.

Considering this in Figure 3, it may be seen that without the negative thermistor having the characteristics shown in Figure 2, the current change in the circuit as the metal resistance thermometer goes from one temperature to another will be indicated by a rather small change in the reading of the ammeter 21 as compared to the increased sensitivity or amplifying effect produced when the negative thermistor 20 having the voltage-current characteristics shown in Figure 2 is in the circuit as shown in Figure 3. Here the current change of the resistance thermometer 16 in going from temperature $T_1$ to $T_2$ will be, in effect, amplified greatly by the negative thermistor 20 to cause a corresponding larger movement of the pointer of the ammeter 21.

Figure 4:
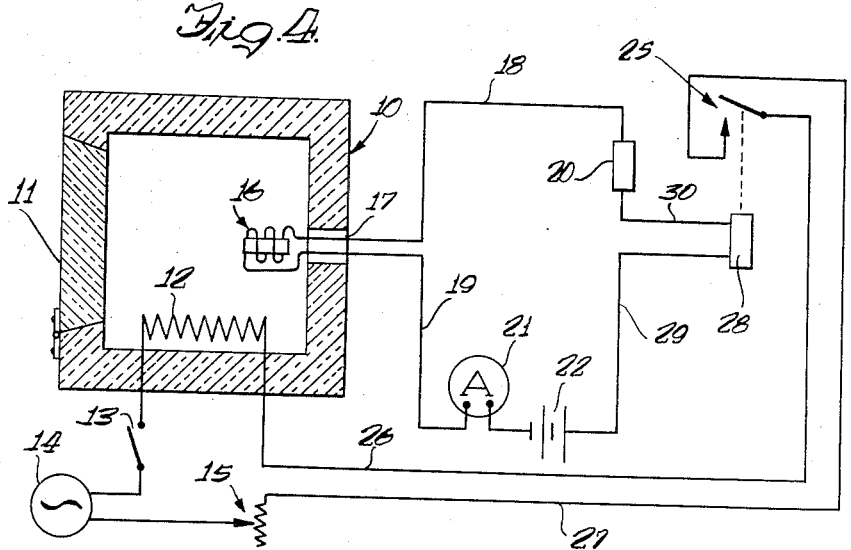
Figures 4 and 5 are diagrammatic views of other embodiments of the present invention.
Figure 5:
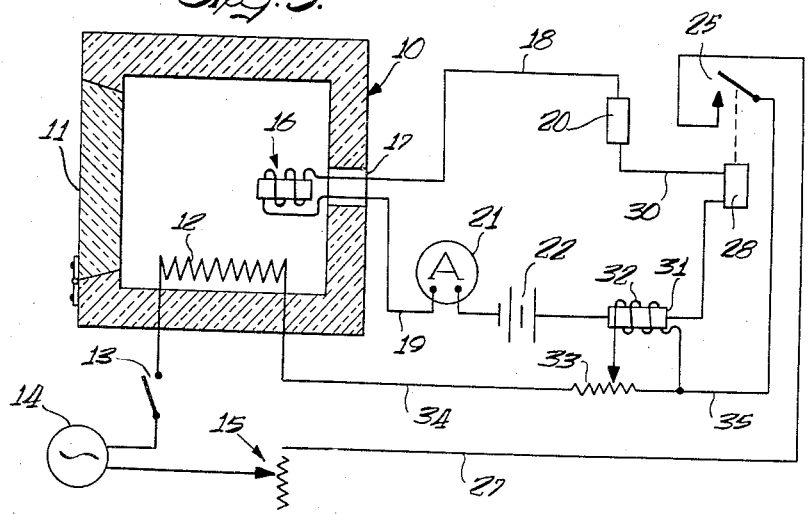

Carrying these elements further into one of the control circuits of the present invention, reference is next made to Figure 4. In Figures 4 and 5 those elements which are substantially identical with the elements previously described in Figure 3 will be designated with the same numerals. Thus it may be seen in Figure 4 that an electric furnace 10 of any suitable type well known in the art is provided, and the electric furnace 10 is provided with the door 11, the electrical heating element 12 and a resistance thermometer 16 mounted through an opening 17 in one wall of the furnace 10. In this embodiment one end of the heating coil 12 is again connected to the power source 14 through single pole single throw switch 13. The other end of the heating coil 12 is connected to one contact of the pair of relay contacts 25 through a conductor 26. One side of the rheostat 15 is connected to the power source 14 and the other side of the rheostat 15 is connected to the other relay contact of the pair of relay contacts 25 through a conductor 27. The pair of relay contacts 25 are associated with the relay 28 in such a manner that when relay 28 is energized, relay contacts 25 are closed and when relay 28 is deenergized, relay contacts 25 are opened. One side of the coil of the relay 28 is connected to one side of battery 22 through conductor 29. The other side of the battery 22 is connected to the ammeter 21, and the other side of the ammeter 21 is connected to one end of the metal resistance thermometer 16 through conductor 19. The other side of the metal resistance thermometer 16 is connected to the negative thermistor 20 through conductor 18, and the other side of the negative thermistor 20 is connected to the other side of the coil of relay 28 through conductor 30.

In describing the operation of the embodiment shown in Figure 4, it is first assumed that the furnace 10 is relatively cool and that switch 13 is closed. Since the furnace 10 is relatively cool, the resistance of the metal resistance thermometer 16 will be relatively low and substantial battery current will pass therethrough and through the thermistor 20 to the relay coil of relay 28. By a proper matching of the battery 22, the metal resistance thermometer 16, the negative thermistor 20 and the relay 28 this current will be sufficient to cause an energization of relay 28 and a consequent closing of contacts 25. Relay contacts 25, upon closing, complete the circuit for the operation of the electric heating element 12. The electric heating element 12 will then heat the furnace 10. The voltage developed across the electrical heating element 12 may be varied by an adjustment of rheostat 15 to any desired degree. As the electric furnace 10 is heated, the metal resistance thermometer 16 will respond to the higher temperature of the furnace by an increase in the resistance of the metal resistance thermometer 16, since the metal resistance thermometer 16 has a positive temperature coefficient. Now if $T_1$ and $T_2$ are the respective maximum and minimum temperatures above and below the desired furnace temperature, the elements of the metal resistance thermometer 16, the negative thermistor 20, the relay coil of the relay 28 and the battery 22 are so selected that at temperature $T_1$ of the metal resistance thermometer 16 the described circuit has a resistance low enough to permit the energization of relay 28 while at the temperature $T_2$ of the metal resistance thermometer 16, the circuit will have a resistance high enough to cause the deenergization of the relay coil of relay 28. Thus when temperature $T_2$ of the electric furnace 10 is reached, relay 28 will deenergize opening contacts 25 to break the operating circuit for the electrically heating element 12. The furnace 10 will then begin to cool due to heat losses therefrom, and when the furnace 10 cools to the temperature $T_1$, sufficient current will then again flow in the described circuit to permit another energization of relay 28 with a subsequent reoperation of the circuit for heating coil 12. Now it may be seen by comparison of Figures 1 and 2 that the negative thermistor 20 has an amplifying effect upon the circuit. Where the temperature change from $T_1$ to $T_2$ in Figure 2 results in a small incremental change in the current through the metal resistance thermometer 16, the small changing voltage across the metal resistance thermometer 16 applied to the negative thermistor 20, will cause a much greater incremental change in the current through the circuit. It has been found that this relatively greater incremental current change permits an easy and accurate adjustment of the circuit elements so that the temperature change between $T_1$ and $T_2$ may be kept relatively small. Thus, the range of temperature fluctuation of the electric furnace 10 from a desired furnace temperature may be kept to a minimum.

Turning next to the embodiment of the present invention shown in Figure 5, reference is made thereto. In this embodiment the temperature deviations of the furnace from a pre-selected temperature are still further reduced, and it has been found that for practical purposes there is no departure of the temperature of the electric furnace 10 from the pre-selected temperature. The embodiment shown in Figure 5 has many elements identical with those in Figure 4 and the same numerals that are used in Figure 4 are applied to those elements in Figure 5. As in Figure 4, one side of the relay coil of relay 28 is connected to one side of the negative thermistor 20 through conductor 30, however, in the embodiment shown in Figure 5, the other side of the relay coil of relay 28 is connected to one side of a positive thermistor 31. The other side of the positive thermistor 31 is connected to the one side of the battery 22 to which the relay coil of the relay 38 was described as connected in Figure 4. The positive thermistor 31 is a non-linear resistor having a high positive temperature coefficient of resistance. A coil of heating wire 32 is wound about the positive thermistor 31. The heating wire 32 cooperates with a potentiometer 33. The potentiometer 33 is included in a circuit similar to that previously described in Figure 4. As shown in Figure 5, one side of the heating coil 12 for the furance 10 is connected to one side of the resistance of the potentiometer 33 through a conductor 34. The other side of the resistance of the potentiometer 33 is connected to one contact of the pair of relay contacts 25 through conductor 35. One end of the heating wire 32 is connected to the movable arm of the potentiometer 33 and the other end of the heating wire 32 is connected to conductor 35. Thus it may be seen that the resistance of the potentiometer 33 is included in the series circuit for the operation of the heating coil 12, which circuit includes, in addition, the pair of relay contacts 25, the rheostat 15, the source of power 14 and the single pole single throw switch 13. It may further be seen that the voltage developed across the heating wire 32 will be dependent upon the setting of the movable arm of the potentiometer 33, since the heating wire 32 is bridged between the movable arm of the potentiometer 33 and one end of the potentiometer 33. It may be seen that the heaing wire 32 is energized whenever the furnace heating coil 12 is energized so that as the furnace 10 is heated, the positive thermistor 31 will also be heated and as the temperature of the furnace goes from the temperatures $T_1$ to $T_2$ the positive thermistor 31 will be much more rapidly heated from its first temperature to its second temperature since the mass of the positive thermistor 31 is substantially smaller than the mass of the furnace heating element 12. Therefore, the rapid increase in resistance of the positive thermistor 31 as the furnace 10 is heated will be added to the effects produced by the metal resistance thermometer 16 and the negative thermistor 20 to further overcome the inertia of the system and provide a smaller temperature fluctuation of the furnace 10 from a predetermined setting.

Assuming a predetermined desired temperature for the electric furnace 10, then the metal resistance thermometer 16, the negative thermistor 20, the relay coil of the relay 28, the positive thermistor 31 and the battery 22 are so selected and matched that when the temperature of the electric furnace 10 is below the selected temperature, sufficient current will flow in the circuit including the relay coil of relay 28 to permit an energization of relay 28 and a closing of contacts 25. The closing of contacts 25 causes an energization of heating coil 12 and heating wire 32. As the temperature of the furnace rises above the selected temperature, the resistance of the thermistors 20 and 31 and the metal resistance thermometer 16 will be high enough to reduce the current flowing through the relay coil of the relay 28 to a point at which relay 28 is deenergized, and contacts 25 are then opened. When contacts 25 are opened, the circuit for the operation of furnace heating element 12 is opened, and the resistance thermometer 16 and the positive thermistor 30 will cool. As the temperature of the furnace 10 drops below the selected temperature, the resistances of the positive thermistor 31, the negative thermistor 30 and the resistance thermometer 16 are low enough to permit an energization of the relay coil of relay 28. It has been found that by a proper matching of the various elements and by a proper adjustment of the potentiometer 33 the temperature fluctuations of the furnace 10 from the selected temperature are so small as to be practically non-existent. The positive thermistor 31, the heating wire 32 and the potentiometer 33 may be designated as an anticipator element for specific cooperation in the control circuits previously described for aiding in the effective and efficient compensation of the various thermal inertias of the system to reduce temperature fluctuations of the furnace 10.

Having described the invention, what is considered new and desired to be protected by Letters Patent is:

1. Means for controlling the operation of an electrically heated device, said means comprising a series circuit including a resistance thermometer in a heat exchange relationship with said device, a source of power, a negative thermistor mounted independently of any heat from said electrically heated device, a positive thermistor, and means operating responsive to the current in said circuit for controlling the temperature of said electric heating device, and means heating said positive thermistor when said electric heating device is operated.

2. In a means for controlling the operation of an electric heating device as claimed in claim 1, wherein said resistance thermometer comprises a linear resistance having a positive temperature coefficient of resistance, said negative thermistor comprises a non-linear resistance having a negative temperature coefficient of resistance and having a voltage-current characteristic wherein the voltage is substantially between a certain value and values less than said certain constant value as the current therethrough increases, and wherein said positive thermistor comprises a non-linear resistance having a high positive temperature coefficient of resistance and a mass substantially smaller than the mass of said device.

3. In an electric furnace, a series circuit including a resistance thermometer, a negative thermistor, a positive thermistor, a relay coil, and a source of power, said resistance thermometer mounted in a heat exchange relationship with the interior of said furnace, said negative and positive thermistors mounted independently of any heat from the interior of said electric furnace, a heating circuit for said electric furnace including a pair of relay contacts associated with said relay coil so that said heating circuit is completed responsive to the energization of said relay coil and restored responsive to the deenergization of said relay coil, means associated with said heating circuit for heating said positive thermistor responsive to the operation of said heating circuit, said resistance thermometer, said negative thermistor, said positive thermistor, said relay coil, and said power source matched so that said relay coil is energized and deenergized to operate said heating circuit to maintain the temperature of said electric furnace substantially in a small temperature increment including a preselected temperature.

4. In an electric furnace as claimed in claim 3, wherein said resistance thermometer comprises a resistance having a positive temperature coefficient of resistance, said negative thermistor comprising a non-linear resistance having a negative temperature coefficient of resistance and having a voltage-current characteristic wherein the voltage is substantially between a certain constant value and values less than said certain constant value as the current therethrough increases, and wherein said positive thermistor comprises a non-linear resistance having a high positive temperature coefficient of resistance and a mass substantially smaller than the mass of said electric furnace.

5. In an electric furnace, a series circuit including a resistance thermometer, a negative thermistor, a positive thermistor, a relay coil and a source of power, said resistance thermometer mounted in a heat exchange relationship with the interior of said furnace, said negative and positive thermistors mounted independently of any heat from the interior of said furnace, a heating circuit for said electric furnace including first resistance heating means, second resistance heating means, and a pair of relay contacts, said first resistance heating means associated with said electric furnace for heating the interior thereof, said second resistance means associated with said positive thermistor for heating said positive thermistor, said pair of relay contacts associated with said relay coil so that said heating circuit is completed to energize said first and second resistance heating means responsive to the energization of said relay coil and restored responsive to the deenergization of said relay coil, said positive thermistor having a mass substantially smaller than the mass of said electric furnace, said resistance thermometer, said negative thermistor, said positive thermistor, said relay coil, and said power source matched so that said relay coil is energized and deenergized to operate said heating circuit to maintain the temperature of said electric furnace substantially in a small temperature increment including a preselected temperature.

6. In an electric furnace as claimed in claim 5, wherein said second resistance heating means comprises a potentiometer having the resistance thereof in series with said first resistance heating means and a heating wire coiled about said positive thermistor and connected between one end of the resistance of said potentiometer and the movable arm of said potentiometer.

References Cited in the file of this patent

UNITED STATES PATENTS

| 1,094,732 | Lyle | Apr. 28, 1914 |
| 1,101,821 | Van Aller | June 30, 1914 |
| 1,276,589 | Steinmetz | Aug. 20, 1918 |
| 2,369,675 | Houghton | Feb. 20, 1945 |
| 2,517,628 | Bottoms | Aug. 8, 1950 |
| 2,567,755 | Amsler | Sept. 11, 1951 |
| 2,602,132 | Young | July 1, 1952 |

FOREIGN PATENTS

| 135,240 | Austria | Nov. 10, 1933 |